United States Patent Office 3,534,080
Patented Oct. 13, 1970

3,534,080
PROCESS FOR PREPARING METHYLENEIMINO-
DIACETONITRILE SUBSTITUTED PHENOLS
Maria T. Mejia, Hyattsville, and James L. Harper, Laurel,
Md., assignors to W. R. Grace & Co., New York, N.Y.,
a corporation of Connecticut
No Drawing. Filed June 13, 1968, Ser. No. 736,553
Int. Cl. C07c 121/66
U.S. Cl. 260—465                                 12 Claims

ABSTRACT OF THE DISCLOSURE

This invention is directed to a process for replacing a nuclear hydrogen of a phenol with a $$-CH_2N=(CH_2CN)_2$$

group, comprising; reacting the phenol, under substantially anhydrous conditions, with methylenebisiminodiacetonitrile in the presence of a substantially non-oxidizing strong acid, and separating and recovering the thus alkylated phenol.

BACKGROUND OF THE INVENTION

This invention is in the field of phenol chemistry. More specifically, this invention is directed to a process for substuting a —$CH_2N=(CH_2CN)_2$ group for a nuclear hydrogen of the phenol. In other words, said invention is directed to a process for "alkylating" a phenol by substituting a —$CH_2N=(CH_2CN)_2$ group for a nuclear hydrogen. Said substitution or alkylation is accomplished by reacting the phenol with methylenebisiminodiacetonitrile (MBIDAN) under substantially anhydrous conditions and in the presence of a substantially non-oxidizing strong acid to replace a nuclear hydrogen of the phenol with a —$CH_2N=(CH_2CN)_2$ group. Iminodiacetonitrile (IDAN) is formed as a by-product of the reaction between the phenol and the MBIDAN.

SUMMARY OF THE INVENTION

In summary this invention is directed to a process for alkylating phenols with a —$CH_2N=(CH_2CN)_2$ group, comprising:

(a) Reacting, in a first inert liquid medium, under substantially anhydrous conditions, and at a temperature of about 60–200° C. for about 0.25–12 hours, a first phenol selected from the group consisting of; (i) mononuclear monohydric phenols having at least one hydrogen ortho to the phenolic hydroxy group; (ii) mononuclear monohydric phenols having a hydrogen para to the phenolic hydroxy group; (iii) an alpha-naphthol having a hydrogen in the beta position; and (iv) a beta-naphthol having a hydrogen in the alpha position with methylenebisiminodiacetonitrile in the presence of a substantially nonoxidizing strong acid to precipitate a solid phase consisting essentially of a first salt of the strong mineral acid and a second phenol, the second phenol being the first phenol alkylated with the —$CH_2N=(CH_2CN)_2$ group, the solid phase being suspended in a liquid phase, the liquid phase consisting essentially of iminodiacetonitrile dissolved in the liquid medium (the liquid medium beng saturated with the first salt);

(b) Separating the solid phase from the liquid phase (If desired the first inert liquid medium and the IDAN can be recovered from the liquid phase by distilling the liquid medium therefrom—preferably under reduced pressure (e.g. ca. 1–100 mm. of mercury absolute pressure).);

(c) Treating the thus separated solid phase with an aqueous solution of a weak base selected from the group consisting of sodium hydrogen carbonate, potassium hydrogen carbonate, and ammonium carbonate to convert the first salt to free second phenol and a second salt of the strong acid;

(d) Separating the second phenol from the second salt; and (e) Recovering the separated alkylated phenol.

In preferred embodiments of the process described in the above summary:

DESCRIPTION OF PREFERRED EMBODIMENTS (1) The first inert liquid medium is a hydrocarbon selected from the group consisting of liquid aliphatic, aromatic, cycloaliphatic, and aralkyl hydrocarbons boiling between about 60–200° C. at about 760 mm. of mercury absolute pressure;

(2) The reaction temperature is about 70–100° C.;

(3) The reaction time is about 0.5–8 hours; and (4) The first phenol and the methylenebisiminodiacetonitrile are reacted in substantially equimolar quantities.

In another preferred embodiment (Embodiment A) this invention is directed to a process for alkylating phenols with a —$CH_2N=(CH_2CN)_2$ group comprising:

(a) Reacting in a first inert liquid medium, under substantially anhydrous conditions, and at a temperature of about 60–200° C. for about 0.25–12 hours, a first phenol selected from the group consisting of; (i) mononuclear monohydric phenols having at least one hydrogen ortho to the phenolic hydroxy group; (ii) mononuclear monohydric phenols having a hydrogen para to the phenolic hydroxy group; (iii) an alpha-naphthol having a hydrogen in the beta position; and (iv) a beta-naphthol having a hydrogen in the alpha position with methylenebisiminodiacetonitrile in a first inert liquid medium in the presence of a catalytic amount of a strongly acidic ion exchange resin to form a first system consisting essentially of; (a) a first solution consisting essentially of a second phenol, the second phenol being the first phenol alkylated with the $$-CH_2N=(CH_2CN)_2$$

group, and iminodiacetonitrile dissolved in the first liquid medium; and (b) the ion exchange resin suspended in said medium;

(b) Separating the first solution from the suspended ion exchange resin (The separated ion exchange resin can be recovered and reused without subsequent treatment as the strong acid in step (a) of a subsequent run);

(c) Separating the second phenol and the iminodiacetonitrile components of the first solution from the first inert liquid medium (preferably by distilling liquid medium (preferably under reduced pressure, e.g., ca. 1–100 mm. of mercury absolute) and recovering said liquid medium);

(d) Dissolving the thus separated second phenol and iminodiacetonitrile in a second inert liquid medium to form a second solution consisting essentially of the second phenol and the iminodiacetonitrile dissolved in the second liquid medium;

(e) Crystallizing the second phenol from the second solution (The IDAN can be recovered from the mother liquor from which the second phenol was crystallized by distilling the second inert liquid medium from said mother liquor (after separating crystallized phenol therefrom) preferably under reduced pressure—e.g., ca. 1–100 mm. of mercury absolute); and (f) Recovering the crystallized second phenol.

In variations of Embodiment A:

(1) The second inert liquid medium is water;

(2) The first inert liquid medium is a hydrocarbon selected from the group consisting of a liquid aliphatic, aromatic, cycloaliphatic, and aralkyl hydrocarbons boiling between about 60–200° C. at about 760 mm. of mercury absolute pressure;

(3) The reaction temperature is about 70–100° C.;
(4) The reaction time is about 0.5–8 hours; and
(5) The first phenol and the methylenebisiminodiacetonitriles are reached in substantially equimolar quantities.

DETAILED DESCRIPTION OF THE INVENTION

We have made the surprising and completely unobvious discovery that phenols can be alkylated by reacting the phenols with MBIDAN in the presence of a substantially non-oxidizing strong acid in an inert liquid medium under substantially anhydrous conditions.

Substantially any strong, non-oxidizing acid can be used in the process of this invention. Typical examples of such acids are sulfuric acid, hydrochloric acid, benzene sulfonic acid, toluene sulfonic acids, phosphoric acids (especially orthophosphoric acid), and strongly acidic ion exchange resins. Typical of ion exchange resins suitable for use in the process of this invention are sulfonated phenolic resins, sulfonated hydrocarbon resins. Carboxylic acid resins have also been used with excellent results in our process. We have found that Amberlyst 15, a strongly acidic sulfonated styrene-divinyl benzene copolymer having an acid value of about 1.8 milli-equivalent per gram, is exceptionally well adapted for use in the process of this invention.

Perchloric acid and nitric acid are typical examples of strong oxidizing acids which are unsuitable for use in the process of this invention.

While the process of the invention must be carried out under substantially anhydrous conditions we have found that small quantities of water do not harm the reaction. For example the acid can be added as ordinary concentrated sulfuric acid which contains about 3–5% of water by weight, it can be also syrupy orthophosphoric acid which analyzes about 15% water by weight, or it can be the monohydrated form of toluene sulfonic acid. Para-toluene sulfonic acid having 1 molecule of water per molecule of sulfonic acid has given excellent results.

For best results, except where using a strongly acidic ion exchange resin, we prefer, where adding one

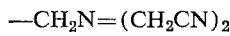

group per molecule of phenol, to use about 0.5–2 equivalents of acid per mole of phenol being alyklated; however, we have obtained excellent results where using 0.1–3 equivalents of acid per mole of phenol. Where adding two —CH$_2$N=(CH$_2$CN)$_2$ groups per molecule of phenol we use twice the aforesaid quantities of acid and where adding three —CH$_2$N=(CH$_2$CN)$_2$ groups per molecule of phenol we use three times the aforesaid quantities of acid (i.e., to add two —CH$_2$N=(CH$_2$CN)$_2$ groups per mole of phenol we prefer to use about 1–4 equivalents of acid per molecule of phenol, but we have obtained excellent results where using 0.2–6 equivalents of acid per mole of phenol). It is understood that an equivalent of an acid is that quantity of acid which will yield one unit of hydrogen ion. Thus, where working with grams, one equivalent of acid is that quantity of acid which will yield one gram of hydrogen ion and where working with pounds one equivalent of acid is that quantity of acid which will yield one pound of hydrogen ion. For the purpose of this reaction orthophosphoric acid is a monoprotic ("monobasic") acid because only the first hydrogen of said acid is strongly ionized.

We have found that substantially any hydrocarbon, aromatic such as benzene, aralkyl such as toluene or ethyl benzene, aliphatic such as heptane, hexane, and the like, and cycloaliphatic such as cyclohexane and ethyl- or methyl-cyclohexane can be used with excellent results as an inert solvent in the process of this invention. Non-basic substituted hydrocarbons such as chlorobenzene, bromobenzene, chloroheptane, nitrobenzene, and the like have also been used with excellent results.

On the other hand, basic solvents such as pyridine, dioxane, and aniline have been found to be unacceptable for use as solvents. Thus, an inert solvent must be one that is substantially non-basic. It is true that benzene and various acetylinic and olefinic hydrocarbons are Lewis bases. However, such hydrocarbons—being extremely weak bases—are inert for the purpose of this invention and have been used with excellent results in the process of this invention. We have, as noted supra, obtained excellent results with chlorinated hydrocarbons (and with nitrobenzene) which boil within the range of about 60–220° C.

Where using strongly acidic ion exchange resins as acids in the process of this invention we prefer to use about 0.2–0.5 equivalent of said acid resin per mole of phenol, however, we have obtained excellent results where using about 0.1–5 equivalents of strongly acidic ion exchange resin per mole of phenol.

Where adding only one —CH$_2$N=(CH$_2$CN)$_2$ group to each molecule of phenol we prefer to use about 0.8–1.5 moles of MBIDAN per mole of phenol. Where dialkylating a phenol (i.e., adding two —CH$_2$N=(CH$_2$CN)$_2$ groups per mole of phenol) we prefer to use about 1.8–2.7 molecule of MBIDAN per molecule of phenol and where trialkylating the phenol (i.e., adding three

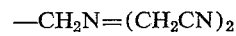

groups per mole of phenol) we prefer to use about 2.8–4 moles of MBIDAN per mole of phenol.

The following equation represents a reaction obtained when phenol is monoalkylated by treating with MBIDAN in the presence of toluene sulfonic acid:

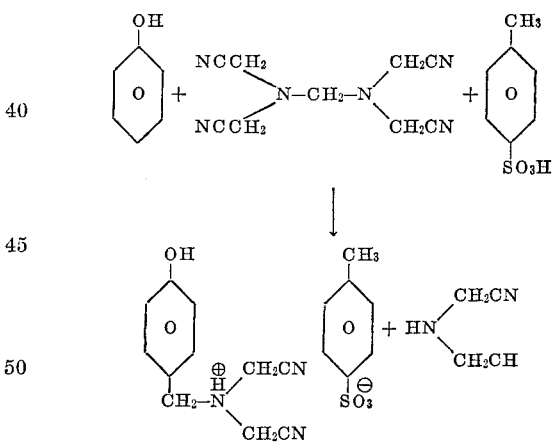

It is noted that in this instance the product is the salt of the alkylated phenol and the toluene sulfonic acid. We convert this salt to the free phenol by treating the salt with an aqueous solution of a weak base such as sodium hydrogen carbonate, potassium hydrogen carbonate, or ammonium carbonate. While substantially any concentration of the aforesaid carbonate in water can be used, we prefer, because of the solubility of the alkylated phenol in water, to use a fairly concentrated solution of the carbonate. For example, with sodium hydrogen carbonate we prefer to use a saturated solution or nearly saturated solution although excellent results have been obtained with more dilute solutions. The following equation represents a reaction that occurs when the salt of the aforesaid alkylated phenol and para toluene sulfonic acid is reacted with an aqueous solution of sodium hydrogen carbonate:

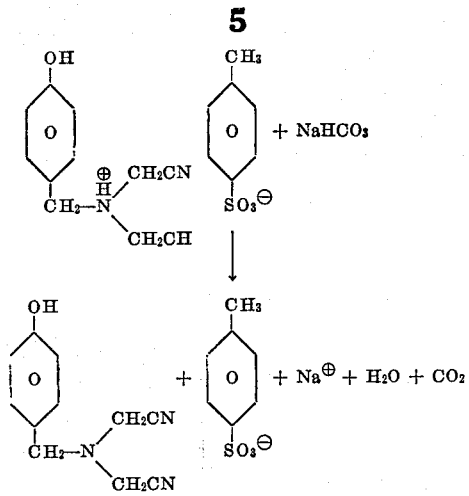

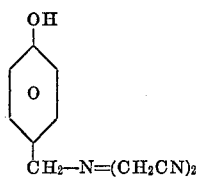

precipitated as the sulfonic acid was added. After adding all of the sulfonic acid, the mixture in the flask was maintained at about 70° C. (with stirring), and small samples were removed from time to time and tested for phenol ($C_6H_5OH$) by gas chromatography. Six hours after the sulfonic acid had all been added the mixture in the flasks was found to be free of $C_6H_5OH$.

The reacted mixture was cooled and the crystalline precipitated

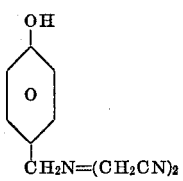

salt of p-toluene sulfonic acid was separated from the liquid component (Component A) of said mixture.

These crystals were washed with fresh benzene, dried, and treated with about 85 grams of a 10% solution of sodium hydrogen carbonate in water to convert the alkylated phenol salt of p-toluene sulfonic acid to the sodium salt of p-toluene-sulfonic acid and free

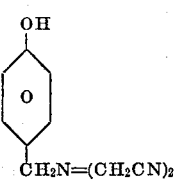

Conversion (one pass yield) to

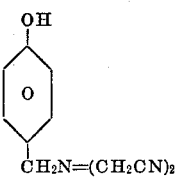

based on the phenol charged was about 65% of theory.

Component A was evaporated to dryness and white crystals, identified as IDAN, were recovered. The IDAN recovery was substantially quantitative based on the MBIDAN charged and the above discussed reactions.

Liquid Component A consisting essentially of IDAN dissolved in benzene, the benzene being saturated with the aforesaid salt of

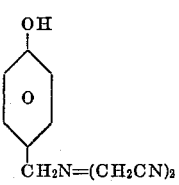

and p-toluene sulfonic acid, was distilled to separate the benzene (as distillate) from the IDAN which remained behind as a residue. Both the benzene and the IDAN were recovered.

Where using an ion exchange resin as strong acid for alkylating phenol with MBIDAN the product is the free alkylated phenol rather than a salt of said phenol and the strongly acidic ion exchange resin. The following equation represents the reaction that occurs when p-nonylphenol is alkylated with MBIDAN in toluene in the presence of Amberlyst 15 (a strongly acidic ion exchange resin described supra):

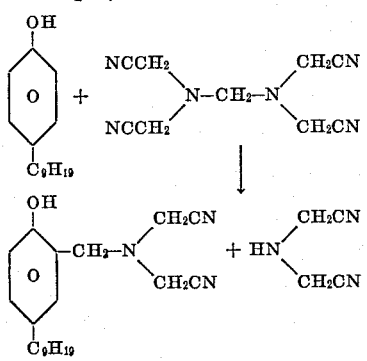

Where using a strongly acidic ion exchange resin as acid in the process of this invention, we, after running the alkylation reaction to produce a phenol alkylated with —$CH_2N$=$(CH_2CN)_2$, separate the insoluble resin from the solution of reaction products by filtration, centrifugation, or decantation and evaporate the separated solution from the dissolved products leaving the alkylated phenol and the IDAN by-product as solids. We then take up these solids (dissolve the solids) in a suitable second inert liquid medium—for example, water or a lower aliphatic or cycloaliphatic alcohol—having the second medium heated somewhat above room temperature to increase the solubility of the alkylated phenol therein. We then cool the resulting solution and crystallize the alkylated phenol. We recover and dry the phenol. If desired the recovered product may be redissolved and recrystallized to obtain a purer product; however, this is generally unnecessary.

The intant invention will be better understood by referring to the following specific but nonlimiting examples. It is understood said invention is not limited to these examples which are offered merely as illustrations, and it is also understood that modifications can be made without departing from the spirit and scope of the invention.

Example I

A 0.1 mole (9.4 grams) portion of phenol and 0.1 mole of MBIDAN were added to 500 ml. of benzene in a three-neck flask equipped with a mechanical stirrer, reflux condenser, and a dropping funnel. The flask was also provided with a thermometer well. The temperature of the mixture in the flask was adjusted to 70° C. and a solution of 0.1 mole of p-toluene-sulfonic acid monohydrate in about 20 ml. of ethanol was added dropwise to the mixture in the flask while stirring said mixture and while maintaining the temperature of the mixture at about 70° C. A solid (the salt of

Example II

A 0.05 mole portion of

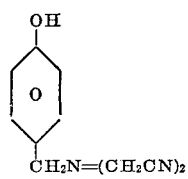

prepared in Example I was boiled with about 0.2 mole of sodium hydroxide in about 100 milliliters of water (added water to maintain the volume substantially constant) until the evolution of ammonia ceased to convert the

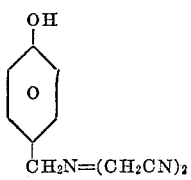

to

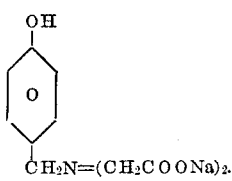

The volume was then reduced by evaporation to about 30 ml. and the concentrated liquor was acidified with $H_2SO_4$ adding the $H_2SO_4$ (ca. 50% $H_2SO_4$) dropwise to precipitate

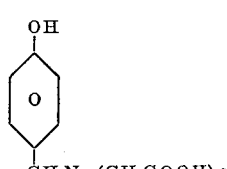

which was separated by filtration, washed with a few milliliters of water and dried.

A portion of the thus prepared acid was half neutralized with aqueous sodium hydroxide solution to form a solution of the half acid,

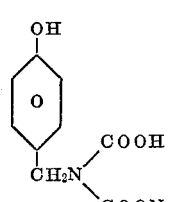

which was found to be an excellent chelating agent for both the iron(II) and iron(III) ions. This half acid and the disodium salt,

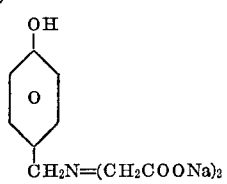

were also found to be excellent materials for removing brown stains produced on sinks, wash basins and the like by iron-containing tap water.

Example III

The general procedure of Example I was repeated; however, in this instance said procedure was modified by replacing the phenol with p-cresol. In this instance the product which precipitated was the p-toluenesulfonic acid salt of

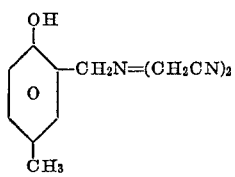

and the final product was

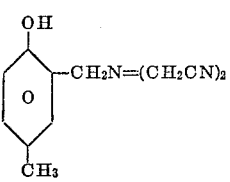

The conversion was 73% of theory.

Example IV

The general procedure of Example III was repeated; however, in this instance the procedure was modified by replacing the p-toluenesulfonic acid with 15 grams of Amberlyst 15 (a strongly acidic ion exchange resin described supra), the Amberlyst 15 being added to the benzene before adding the MBIDAN and the p-cresol. In this instance no precipitate was formed and the Amberlyst 15 did not dissolve. Tests (gas chromatographic analysis of samples) showed that the p-cresol had all reacted at the end of four hours.

The Amberlyst 15 resin was filtered from the benzene solution, said solution consisting essentially of IDAN and

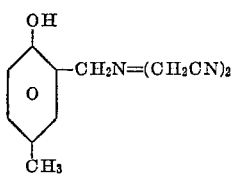

dissolved in benzene, and the benzene was distilled from the filtrate to leave a solid residue. The residue was taken up (dissolved) in about 50 ml. of hot (ca. 85–95° C.) water. The water was cooled, and a precipitate of

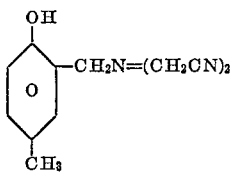

crystallized. The crystals were recovered, dried, and weighed. Conversion was 73% of theory based on the p-cresol charged.

The aqueous mother liquor from which the

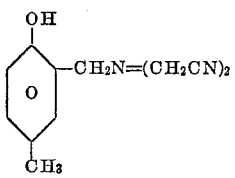

was crystallized was distilled under reduced pressure (ca. 20–25 mm. of mercury absolute) and the IDAN residue left by the distillation was recovered.

Example V

The general procedure of Example IV was repeated; however in this instance 0.1 mole of p-cresol and 2 moles of MBIDAN were used. The product was

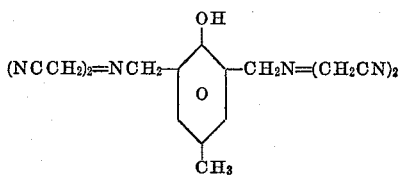

Conversion was 68% of theory.

Example VI

The general procedure of Example IV was repeated; however, in this instance the phenol was

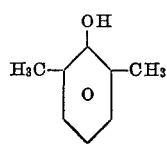

and the product was

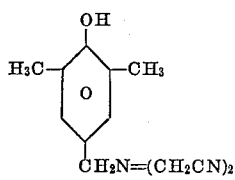

Conversion was 70% of theory.

Example VII

The general procedure of Example IV was repeated; however, in this instance, the procedure was modified by replacing the p-cresol with p-nonylphenol. The residue formed when the benzene was evaporated from the mixture of

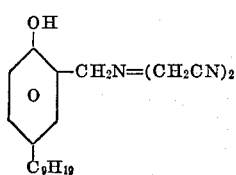

and IDAN formed by the reaction of MBIDAN and p-nonylphenol was an oily mass with solid IDAN suspended therein. This mixture was dissolved in about 50 milliliters of hot (ca. 65–70° C.) ethanol. When the resulting ethanol solution was cooled to room temperature a viscous oily mass of

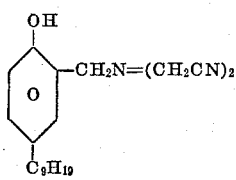

separated. This oil was recovered, dried (i.e., freed of ethanol) and weighed. Conversion was 71% of theory.

Example VIII

The general procedure of Example I was repeated, however, in this instance the phenol was 2,6-dichlorophenol and the p-toluenesulfonic acid was replaced with 2,4-toluenedisulfonic acid (using 0.05 mole of said acid and 0.1 mole of the dichlorophenol). The final product was

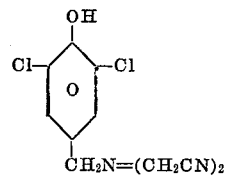

Example IX

The general procedure of Example VIII was repeated; however, in this instance 0.12 mole of 2,4-toluenedisulfonic acid and 0.1 mole of 2,6-dichlorophenol were used. The results were indistinguishable from those of Example VIII.

Example X

The general procedure of Example I was repeated; however, in this instance, the p-toluene sulfonic acid was replaced with sulfuric acid (ca. 95% $H_2SO_4$, using 0.05 mole of acid and 0.1 mole of phenol. The results were substantially identical to those of Example I.

Example XI

The general procedure of Example IV was repeated; however, in this instance only 7 grams of the Amberlyst 15 resin was used and the benzene was replaced with chlorobenzene. The results were substantially identical to those obtained in Example IV.

Example XII

The general procedure of Example I was repeated; however, in this instance the p-toluene sulfonic acid was replaced with about 0.12 mole of anhydrous HCl. The results were substantially identical to those of Example I.

Example XIII

The general procedure of Example XII was repeated. However, in this instance the liquid medium was pyridine. A detectable quantity of

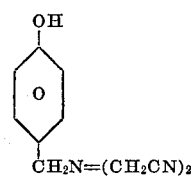

was *not* formed.

Example XIV

The general procedure of Example XIII was repeated; however, in this instance the pyridine was replaced with dioxane. The results obtained were identical with those obtained in Example XIII.

Example XV

The general procedure of Example I was repeated; however, in this instance the phenol was replaced with alphanaphthol. The product,

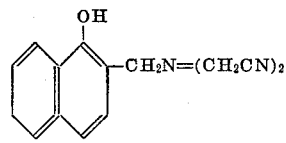

was obtained in a yield of about 70% of the theory.

Example XVI

The general procedure of Example IV was repeated; however, in this instance, the p-cresol was replaced with betanaphthol. The product,

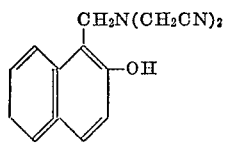

was obtained in a yield of about 75% of theory.

Excellent results have also been obtained where using $H_2SO_4$, $H_3PO_4$, HBr, and pyrophosphoric as strong acids in the process of this invention. Hexane, 1-chlorohexane, heptane, octane, cyclohexane, methylcyclohexane, dimethylcyclohexane, ethylcyclohexane, toluene, ethylbenzene, mixed xylenes, and mixed paraffinic hydrocarbons boiling within the range of about 60–200° C. have been used with excellent results as inert liquid media in the process of this invention.

We have tested a large number of phenols—each of which has been alkylated with 1 to 3

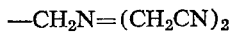

groups according to the process of the instant invention—and have found that hydrolyzing the —CN groups to —COOM groups (where M is an alkali metal ion such as Li, Na, or K) by heating with an aqueous alkali such as LiOH, NaOH, or KOH yields salts which are excellent chelating agents for iron(II) and iron(III) ions. We have also found that the half acids of the thus prepared carboxylic compounds are excellent chelating agents for numerous ions—especially iron(II) and iron(III) ions. Examples of such half-acids include

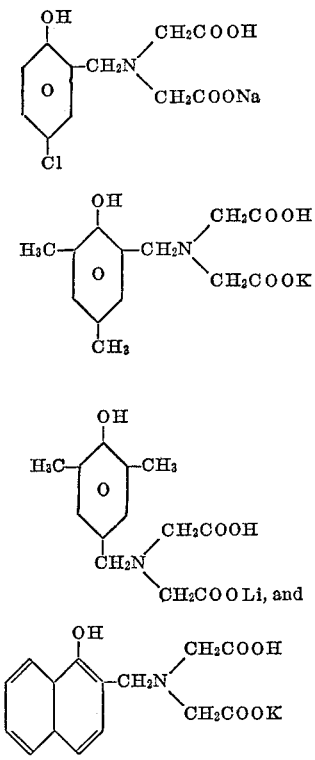

The salts and the half-acids have been found to be excellent materials for removing brown iron stains from sinks, cloth, floors, and the like. Iron salts (chelates) of acids and half-acids made by hydrolizing nitriles prepared by the process of this invention have been used with excellent results as additives for adding iron to soil—especially to alkaline and calcareous soils—the iron being slowly released in the soil.

As used herein, unless otherwise defined where used, the term "percent (%)" means parts per hundred by weight.

We claim:

1. A process for preparing a product phenol, said product phenol consisting of a reactant phenol having 1–3 nuclear hydrogens replaced by —$CH_2N=(CH_2CN)_2$ groups, the reactant phenol being selected from the group consisting of phenol, alpha-naphthol, beta-naphthol, p-nonylphenol, p-cresol, 2,6-dichlorophenol 2,6-dimethylphenol, p-chlorophenol, and 2,4-dimethylphenol, said process comprising:
   (a) forming a first mixture by admixing under substantially anhydrous conditions; (i) an inert liquid medium; (ii) said reactant phenol; and (iii) an acid selected from the group consisting of sulfuric acid hydrochloric acid, benzene sulfonic acid, toluene sulfonic acid, and phosphoric acid; and (iv) methylenebisiminodiacetonitrile, said acid being supplied in an amount to provide 1 to 4 equivalents of acid per mole of reactant phenol and said methylenebisiminodiacetonitrile being supplied at a rate of 0.8 to 4 moles per mole of reactant phenol; said components reacting and
   (b) forming a second mixture consisting essentially of; (i) a liquid phase consisting essentially of iminodiacetonitrile dissolved in said liquid medium; and (ii) a solid phase consisting essentially of a salt of said product phenol and said acid by maintaining said first mixture at about 60–200° C. for about 0.25–12 hours;
   (c) separating said solid phase from said liquid phase; and
   (d) treating the separated solid phase with an aqueous solution of a weak base to convert said salt to the free product phenol.

2. The process of claim 1 in which the said inert liquid medium is a hydrocarbon selected from the group consisting of liquid aliphatic, aromatic, cycloaliphatic, and aralkyl hydrocarbons boiling between about 60–200° C. at about 760 mm. of mercury absolute pressure.

3. The process of claim 1 in which; (a) the methylenebisiminodiacetonitrile is supplied at a rate of 1 mole per mole of reactant phenol; and (b) the acid is supplied in an amount to provide 1 equivalent of acid per mole of reactant phenol.

4. The process of claim 1 in which the second mixture is formed by maintaining the first mixture at about 70–100° C.

5. The process of claim 1 in which the second mixture is formed by maintaining the first mixture at about 70–100° C. for about 0.5–8 hours.

6. A process for preparing a product phenol, said product phenol consisting of a reactant phenol having 1–3 nuclear hydrogens replaced by —$CH_2N=(CH_2CN)_2$ groups, the reactant phenol being selected from the group consisting of phenol, alpha-naphthol, beta-naphthol, p-nonylphenol, p-cresol, 2,6-dichlorophenol, 2,6-dimethylphenol, p-chlorophenol, and 2,4-dimethylphenol, said process comprising:
   (a) forming a first mixture by admixing under substantially anhydrous conditions; (i) a first inert liquid medium; (ii) said reactant phenol; (iii) a strongly acidic ion exchange resin selected from the group consisting of sulfonated phenolic resins, sulfonated hydrocarbon resins, and carboxylic acid resins; and (iv) methylenebisiminodiacetonitrile, said acidic resin being supplied in an amount to provide 0.1–5 equivalents of acid per mole of reactant phenol and said methylenebisiminodiacetonitrile being supplied at a rate of 0.8 to 4 moles per mole of reactant phenol; said components reacting and
   (b) forming a second mixture consisting essentially of; (i) a liquid phase consisting essentially of said product phenol and iminodiacetonitrile dissolved in said first inert liquid medium; and (ii) a solid phase consisting essentially of said acidic resin by maintaining said first mixture at about 60–200° C. for about 0.25–12 hours;
(c) separating said liquid phase from said solid phase;
(d) separating said product phenol and said iminodiacetonitrile from said first inert liquid medium;
(e) dissolving the separated product phenol and iminodiacetonitrile in a second inert liquid medium to form a solution consisting essentially of: (i) said product phenol; (ii) said iminodiacetonitrile; and (iii) said second liquid medium; and
(f) crystallizing said product phenol from said second solution.

7. The process of claim 6 in which the second inert liquid medium is water.

8. The process of claim 6 in which the first inert liquid medium is a hydrocarbon selected from the group consisting of liquid aliphatic, aromatic, cycloaliphatic, and aralkyl hydrocarbons boiling between about 60–200° C. at about 760 mm. of mercury absolute pressure.

9. The process of claim 6 in which the acidic resin is supplied in an amount to provide 0.2 equivalent of acid per mole of reactant phenol.

10. The process of claim 6 in which the second mixture is formed by maintaining the first mixture at about 70–100° C.

11. The process of claim 6 in which the second mixture is formed by maintaining the first mixture at about 70–100° C. for about 0.5–8 hours.

12. The process of claim 6 in which the methylenebisiminodiacetonitrile is supplied at a rate of 1 mole per mole of reactant phenol.

References Cited
UNITED STATES PATENTS 3,463,805   8/1969   Morgan et al. _____ 260—465

JOSEPH P. BRUST, Primary Examiner

U.S. Cl. X.R.

260—465.5, 505, 519